(12) United States Patent
Toyoda et al.

(10) Patent No.: US 11,516,047 B2
(45) Date of Patent: Nov. 29, 2022

(54) COMMUNICATION SYSTEM (71) Applicant: YAZAKI CORPORATION, Tokyo (JP)

(72) Inventors: Ryoma Toyoda, Makinohara (JP); Kunihiko Yamada, Makinohara (JP); Masashi Tsukamoto, Makinohara (JP); Junki Ema, Makinohara (JP); Masaaki Suguro, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/177,184

(22) Filed: Feb. 16, 2021

(65) Prior Publication Data
US 2021/0258188 A1 Aug. 19, 2021

(30) Foreign Application Priority Data
Feb. 17, 2020 (JP) .............................. JP2020-024612

(51) Int. Cl.
*H04L 12/40* (2006.01)
*H04L 45/00* (2022.01)

(52) U.S. Cl.
CPC .. *H04L 12/40182* (2013.01); *H04L 12/40189* (2013.01); *H04L 12/40202* (2013.01); *H04L 45/22* (2013.01); *H04L 2012/40215* (2013.01)

(58) Field of Classification Search
CPC ......... H04L 12/40182; H04L 12/40189; H04L 12/40202; H04L 12/40; H04L 12/40176; H04L 2012/40215; H04L 45/22; B60R 16/023; B60R 16/03
See application file for complete search history.

(56) References Cited

U.S. PATENT DOCUMENTS

| | | | |
|---|---|---|---|
| 7,113,698 B1* | 9/2006 | Ryhorchuk | H04B 10/0771 370/216 |
| 2003/0043750 A1* | 3/2003 | Remboski | H04L 45/566 370/242 |
| 2003/0043779 A1 | 3/2003 | Remboski et al. | |
| 2004/0078632 A1* | 4/2004 | Infante | G06F 3/0613 714/4.2 |
| 2005/0122899 A1* | 6/2005 | DeBoer | H04L 45/28 370/222 |

(Continued)

FOREIGN PATENT DOCUMENTS

| JP | 2003-273810 A | 9/2003 |
|---|---|---|
| JP | 2006-164706 A | 6/2006 |

(Continued)

*Primary Examiner* — Stephen J Clawson
(74) *Attorney, Agent, or Firm* — Kenealy Vaidya LLP (57) ABSTRACT

A communication path in a loop form is formed by trunk lines and a redundant communication path, which is formed by a switch and a backup line. In order to be applied to a bus-type communication network such as a CAN, the switch is normally off, and the backup line is disconnected from a path in a steady state. A disconnection detection unit is provided at each of joint connectors. When any disconnection detection unit detects disconnection, the switch is closed to enable use of the redundant path. Further, content of a routing map of a central gateway is automatically rewritten to preferentially select the redundant path that is not disconnected, and thus the path is changed.

5 Claims, 6 Drawing Sheets (56) References Cited

U.S. PATENT DOCUMENTS

| | | | |
|---|---|---|---|
| 2007/0211623 A1* | 9/2007 | Nishioka | H04L 45/28 370/218 |
| 2008/0201491 A1 | 8/2008 | Fuhrmann | |
| 2012/0243403 A1* | 9/2012 | Hu | H04L 45/48 370/217 |
| 2015/0019897 A1 | 1/2015 | Horihata | |
| 2015/0304743 A1* | 10/2015 | Carpini | H04J 14/0272 398/31 |
| 2018/0097721 A1 | 4/2018 | Matsui et al. | |
| 2018/0370540 A1* | 12/2018 | Yousuf | B60W 10/20 |
| 2021/0359876 A1* | 11/2021 | Weinstein | H04L 12/413 |

FOREIGN PATENT DOCUMENTS

| | | |
|---|---|---|
| JP | 2013-172200 A | 9/2013 |
| JP | 2019-137394 A | 8/2019 |
| WO | 2017/029968 A1 | 2/2017 |

* cited by examiner

COMMUNICATION SYSTEM

CROSS REFERENCE TO RELATED APPLICATIONS

This application is based on and claims priority from Japanese patent application No. 2020-024612 filed on Feb. 17, 2020, the entire contents of which are incorporated herein by reference.

TECHNICAL FIELD

The present invention relates to, for example, a communication system that can be used for communication between a plurality of electrical components via a transmission path of a wire harness on a vehicle, and particularly relates to a technique for coping with a failure such as disconnection of a communication path.

BACKGROUND ART

For example, as disclosed in JP-A-2019-137394, a technique for simplifying a wiring path of a wire harness on a vehicle and shortening an electric wire length is applied to a wiring structure of wire harness. Further, it is disclosed that the technique is implemented with: a power supply that supplies power in the vehicle; a plurality of power supply distributors; a power supply trunk line that is wired between the plurality of power supply distributors along a front-rear direction of the vehicle or a width direction of the vehicle; a power supply line that is wired between the power supply and at least one of the plurality of power supply distributors; a plurality of communication control parts that control the plurality of power supply distributors; and a communication trunk line that is wired between the plurality of communication control parts.

Further, as shown in FIG. 8 and disclosed in [0033] of JP-A-2019-137394, one loop is formed including a first communication control part 21a, a first communication trunk line 22a, a second communication control part 21b, a second communication trunk line 22b, a third communication control part 21c, a third communication trunk line 22c, a fourth communication control part 21d, and a fourth communication trunk line 22d. Accordingly, when a communication control part detects disconnection of a communication trunk line connected to the communication control part, the communication control part cuts off electrical connection with the disconnected communication trunk line. Then, a current can be supplied to the communication control part via a communication trunk line of another path. For example, when the second communication control part 21b detects disconnection of the first communication trunk line 22a, electrical connection with the first communication trunk line 22a can be cut off and a current from the second communication trunk line 22b can be supplied to the second communication control part 21b. By forming a loop with a plurality of communication control parts and communication trunk lines in this manner, malfunction and failure of each part of the vehicle can be effectively prevented.

SUMMARY OF INVENTION

Technical Problem

In a case where a communication path is formed in a loop type as shown in FIG. 8 of JP-A-2019-137394, even when a failure such as disconnection occurs in a part of the communication path, it is possible to secure a communication path by using another path in which no failure occurs, and thus it is possible to improve communication reliability.

However, with respect to a typical on-vehicle system in the related art, in a case where a bus-type communication network such as a controller area network (CAN) is used therein, an initial communication path is determined according to a routing map determined in advance. But when a plurality of communication paths are connected in a loop form in order to back up for disconnection, a problem occurs that the routing map cannot be created.

Even if the on-vehicle system has a plurality of communication paths for backup, when it is found that communication via a certain communication path is not possible due to disconnection or the like, it is necessary to search for and switch to another communication path that can be used. Therefore, there is possibility that a relatively long time is required before normal communication can be started.

The present invention has been made in view of the above circumstances, and an object of the present invention is to provide a communication system capable of, when a failure such as disconnection of a communication path occurs, enabling use of another communication path that is not disconnected, and reducing communication delay.

A communication system according to an embodiment has a communication line configured in a loop form and a transmission path having a coupling connector provided at each of a plurality of connection positions on the communication line. The communication system includes:

a path switch;
a disconnection detection part;
a gateway; and
a communication path control part, in which the path switch that is controllable to cut off a part of the communication line in a steady state is provided inside or near one or a plurality of the coupling connectors, in which the disconnection detection part that detects presence or absence of disconnection in one or more paths included in the communication line is provided inside or near one or a plurality of the coupling connectors, in which the gateway that has a routing map for controlling a communication path is connected to the communication line, and in which when the disconnection detection part detects presence of disconnection, the communication path control part switches one or a plurality of the path switches to a connected state, and changes content of the routing map to enable use of a path passing through the path switch.

DESCRIPTION OF EMBODIMENTS

A specific embodiment of the present invention will be described below with reference to the drawings.

<Outline of Configuration of Communication System>

Figure 1A:
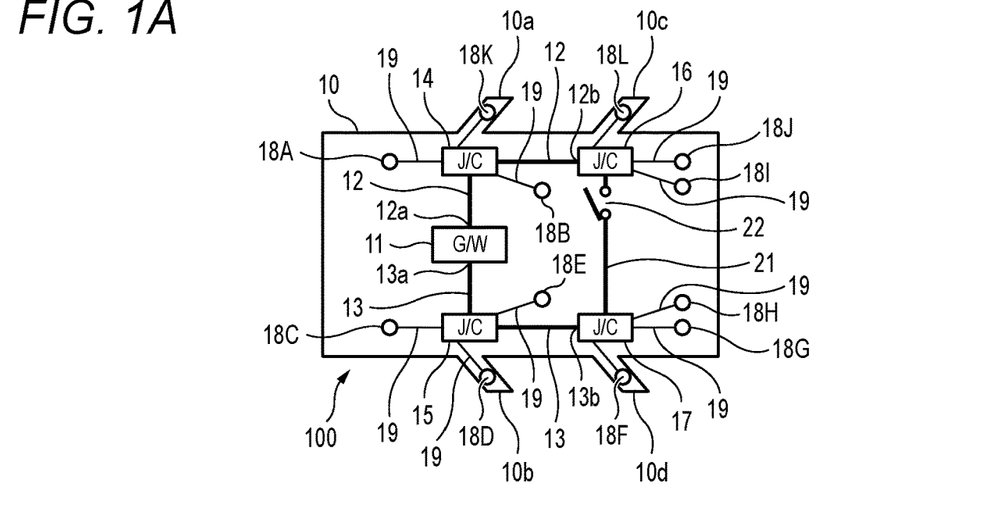
FIG. 1A is a block diagram showing a configuration of a communication system according to an embodiment that is mounted on a vehicle, specifically showing the configuration in a normal state.
Figure 1B:
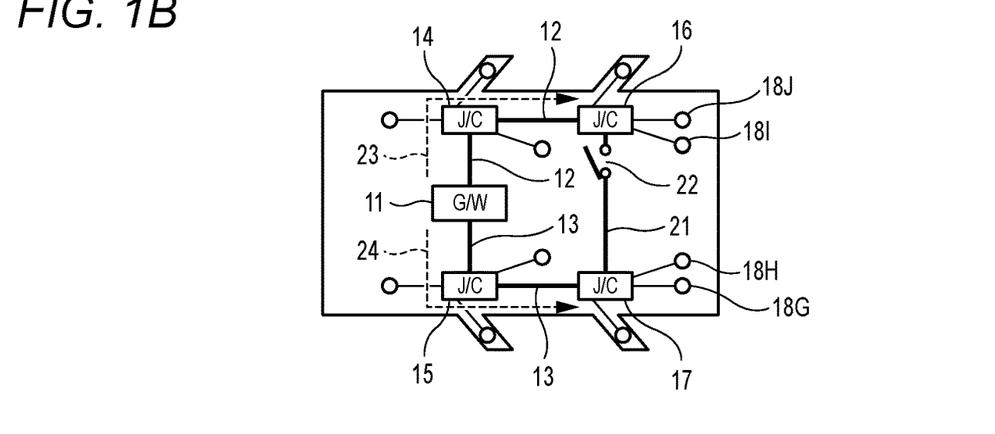
FIG. 1B is a block diagram showing the configuration of the communication system according to the embodiment that is mounted on a vehicle, specifically showing a communication path in a normal state.
Figure 1C:
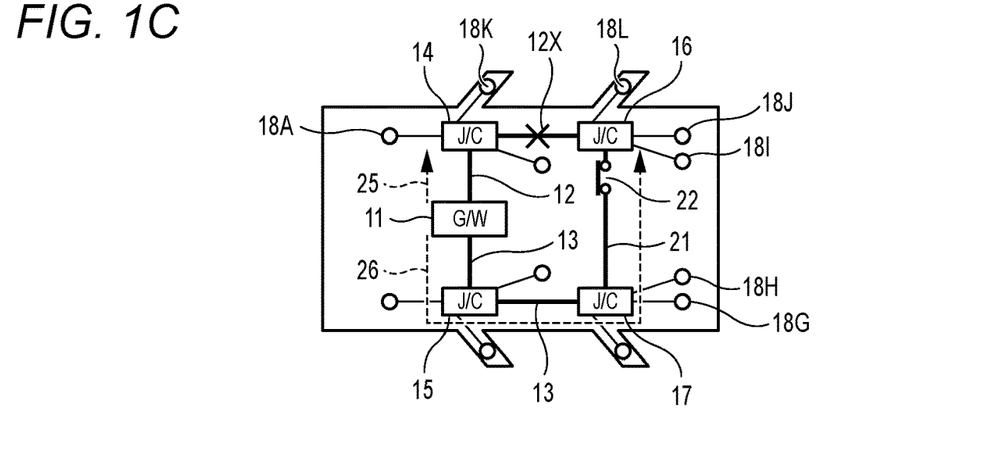
FIG. 1C is a block diagram showing the configuration of the communication system according to the embodiment that is mounted on a vehicle, specifically showing the communication path at the time when disconnection occurs.

An outline of a configuration of a communication system 100 according to an embodiment of the present invention is shown in FIGS. 1A, 1B, and 1C. FIG. 1A shows a configuration in a normal state, FIG. 1B shows a communication path in a normal state, and FIG. 1C shows the communication path at the time when disconnection occurs.

It is assumed that the communication system 100 of the present embodiment is used in a state of being mounted on a vehicle such as an automobile. FIGS. 1A, 1B, and 1C show a layout of components in a plane as viewing a vehicle body 10 from above. In FIGS. 1A, 1B, and 1C, a left side represents a front side of the vehicle body 10 and a right side represents a rear side of the vehicle body 10. Four doors 10a, 10b, 10c, and 10d are arranged on left and right sides of the vehicle body 10.

As shown in FIG. 1A, various types of electrical components 18A, 18B, 18C, 18D, 18E, 18F, 18G, 18H, 18I, 18J, 18K and 18L are installed at various places on the vehicle body 10. Each of the electrical components 18A to 18L includes an electronic control unit (ECU) having a communication function of a CAN standard, and is capable of performing wired communication via the communication system 100.

A wire harness of the communication system 100 shown in FIG. 1A includes a plurality of trunk lines 12 and 13, and a backup line 21. Accordingly, a communication path of the communication system 100 shown in FIG. 1A is generally formed in a loop form. A switch 22 is connected in the middle of a path of the backup line 21. The switch 22 is a normally-off type switch that opens a circuit in a steady state, and is, for example, a switch capable of on-off control, such as a relay. Therefore, in the steady state, a part of the loop of the communication path is opened.

Each of the trunk lines 12, 13, and the backup line 21 is a communication transmission path corresponding to the CAN communication standard, and includes, for example, two communication lines, a power supply line, and a ground line. It is needless to say that the power supply line and the ground line may be prepared separately. In addition, another communication standard such as a CAN flexible data rate (CANFD) using a bus-type network similar to a CAN may be adopted instead of the CAN standard.

As shown in FIG. 1A, the communication system 100 includes a central gateway (G/W) 11 for controlling the communication path. In the configuration of FIG. 1A, a tip 12a of the trunk line 12 is connected to one communication port of the CAN standard of the central gateway 11, and a tip 13a of the trunk line 13 is connected to another communication port of the central gateway 11.

Although not shown, the central gateway 11 is an electronic control unit having a plurality of communication interfaces corresponding to the CAN standard, a routing map, and a control part. Communication paths for communication of the electrical components 18A to 18L and the like are usually determined based on content of the routing map in the central gateway 11.

The content assigned to the routing map indicate communication paths from the central gateway 11 to the electrical components 18A to 18L and the like, via the trunk line 12 or 13, one or more of joint connectors 14 to 17, a branch line 19, and the like, and a path is separately assigned to each communication node.

In the configuration of FIG. 1A, one joint connector (J/C) 14 is connected in the middle of the trunk line 12, and the joint connector 16 is connected to an end 12b of the trunk line 12. The electrical components 18A, 18B and 18K are connected to the joint connector 14 via the branch lines 19 respectively. Each branch line 19 includes two communication lines, a power supply line, and a ground line. The electrical components 18I, 18J and 18L are connected to the joint connector 16 via the branch lines 19 respectively.

In addition, one joint connector 15 is connected in the middle of the trunk line 13, and the joint connector 17 is connected to an end 13b of the trunk line 13. The electrical components 18C, 18D and 18E are connected to the joint connector 15 via the branch lines 19 respectively. The electrical components 18F, 18G and 18H are connected to the joint connector 17 via the branch lines 19 respectively.

The joint connectors 14 to 17 are intermediate components for physically and electrically coupling the branch lines 19, which are configured to connect the electrical components 18A to 18L, to the trunk lines 12 and 13. At least the joint connectors 16 and 17 connected to the respective ends 12b and 13b further have a particular function to be described later.

In a state where no failure such as disconnection occurs in the trunk lines 12 and 13, communication using communication paths 23 and 24 as shown in FIG. 1B can be performed. For example, when communication is to be performed between the electrical component 18J connected to the end 12b of the trunk line 12 and the electrical component 18G connected to the end 13b of the trunk line 13, the communication can be performed using the communication path 23, which connects the joint connector 16 and the central gateway 11, and the communication path 24, which connects the central gateway 11 and the joint connector 17.

Since such information on available communication paths is usually determined in advance and registered in advance in the routing map on the central gateway 11, the central gateway 11 can determine the communication path immediately when the communication is started.

On the other hand, in a state shown in FIG. 1C, it is assumed that disconnection occurs at a disconnection portion 12X in the middle of the trunk line 12 connecting the two joint connectors 14 and 16. Therefore, in the state shown in FIG. 1C, communication cannot be performed in the communication path 23 of FIG. 1B. Therefore, the communication system 100 closes the switch 22 to enable use of a new communication path 26 in which the two joint connectors 16 and 17 are connected by the backup line 21. Further, the content of the routing map on the central gateway 11 is automatically rewritten so that the communication path 26 can be used immediately.

As a result, for example, when communication is to be performed between the electrical component 18A and the electrical component 18J in the state shown in FIG. 1C, path switching is performed so as to start communication immediately using the communication paths 25 and 26. That is, the electrical component 18A and the electrical component 18J are connected via the joint connector 14, the trunk line 12, the central gateway 11, the trunk line 13, the joint connector 17, the backup line 21, the switch 22 and the joint connector 16. Since the disconnection portion 12X is not used in the communication paths 25 and 26, occurrence of delay can be avoided. Since the content of the routing map on the central gateway 11 is rewritten so as to use the communication paths 25 and 26, in communication between the electrical components 18A and 18J, the communication paths 25 and 26 can be used immediately after the start of the communication.

In the state shown in FIG. 1C, since the disconnection portion 12X exists, an entire loop of a path passing through the trunk lines 12 and 13 is not closed even when the two joint connectors 16 and 17 are connected by the backup line 21 and the switch 22, and a correct routing map can be created without any problem in the CAN communication standard. A new and appropriate communication path that is to be used when disconnection occurs can be determined in advance for each disconnection position. Accordingly, a plurality of types of path information determined in advance for each disconnection position can be held in advance on the routing map. Therefore, after a disconnection position is identified, the routing map can be rewritten simply by selecting appropriate path information corresponding to the disconnection position.

<Connection State of Trunk Line End>

Figure 2A:
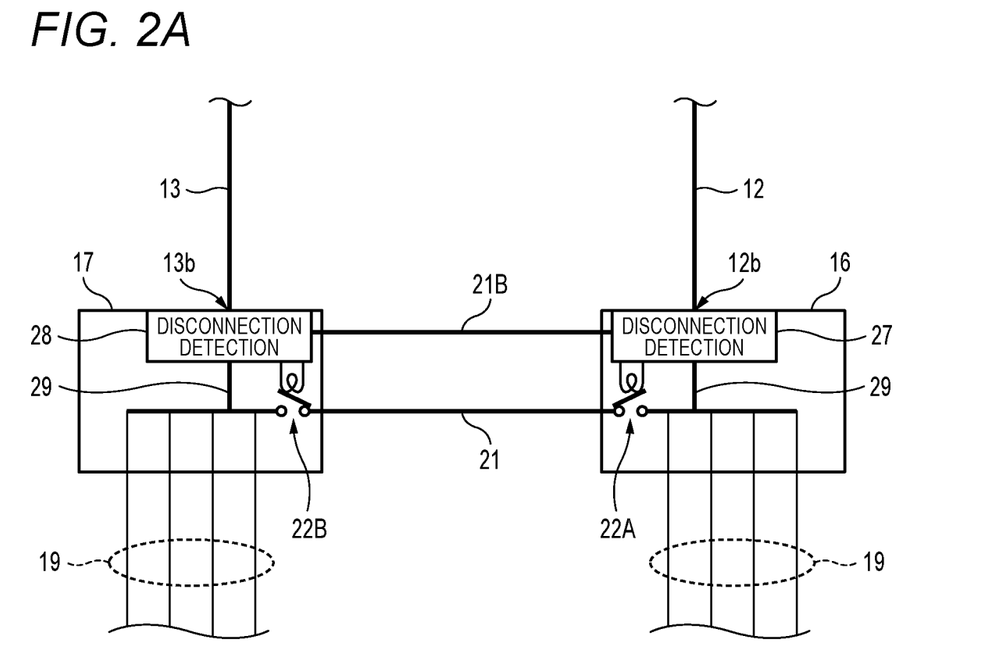
FIG. 2A is an electric circuit diagram showing a connection state of a plurality of trunk line ends included in the communication system, specifically showing a normal state thereof.
Figure 2B:
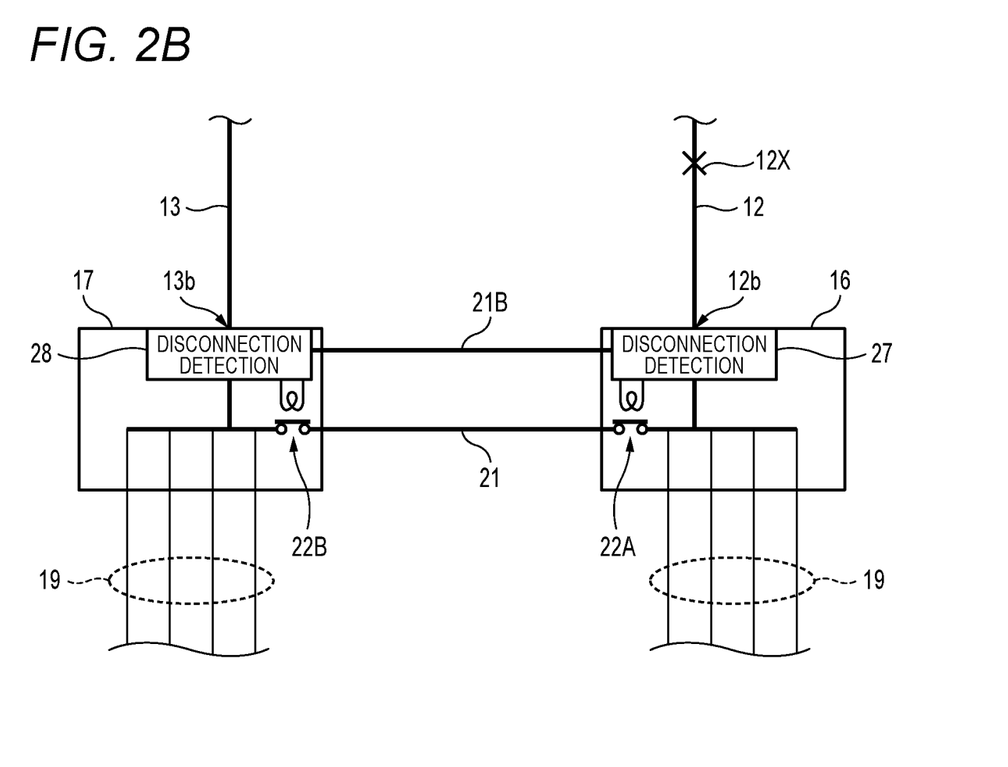
FIG. 2B is an electric circuit diagram showing a connection state of the plurality of trunk line ends included in the communication system, specifically showing a connected state at the time when disconnection occurs.

A specific example of connection states of the ends 12b and 13b of the plurality of trunk lines 12 and 13 included in the communication system 100 is shown in FIGS. 2A and 2B. FIG. 2A shows a normal state and FIG. 2B shows a connected state at the time when disconnection occurs.

In the communication system 100, as shown in FIGS. 2A and 2B, the end 12b of the trunk line 12 is connected to the joint connector 16, and the end 13b of the trunk line 13 is connected to the joint connector 17. Further, in the example of FIGS. 2A and 2B, the backup line 21 is connected between the two joint connectors 16 and 17 constantly, and switches 22A and 22B that establish and cut off the connection of the backup line 21 are built in the respective joint connectors 16 and 17. In addition, a disconnection information transmission circuit (electric wire) 21B for transmitting a dedicated signal between the two joint connectors 16 and 17 is provided in parallel with the backup line 21.

The end 12b of the trunk line 12 and a plurality of the branch lines 19 are electrically connected by a connection portion 29 inside the joint connector 16. Similarly, the end 13b of the trunk line 13 and a plurality of the branch lines 19 are electrically connected by the connection portion 29 inside the joint connector 17. Each of the switches 22A and 22B establishes and cuts off the connection between the backup line 21 and the connection portion 29.

A disconnection detection unit 27 for detecting disconnection of the trunk line 12 is provided inside the joint connector 16, and a disconnection detection unit 28 for detecting disconnection of the trunk line 13 is provided inside the joint connector 17. The disconnection detection unit 27 controls opening and closing of the switch 22A. The disconnection detection unit 28 controls opening and closing of the switch 22B. Upon detecting disconnection, the disconnection detection unit 27 transmits information on the disconnection to the disconnection detection unit 28 via the disconnection information transmission circuit 21B. Similarly, upon detecting disconnection, the disconnection detection unit 28 transmits information on the disconnection to the disconnection detection unit 27 via the disconnection information transmission circuit 21B.

In a state where no disconnection occurs in any of the trunk lines 12 and 13, the switch 22A in the joint connector 16 is opened and the switch 22B in the joint connector 17 is also opened as shown in FIG. 2A, so that the backup line 21 is disconnected from the communication path of a CAN bus. On the other hand, when disconnection occurs at the disconnection portion 12X of the trunk line 12, the switch 22A in the joint connector 16 is closed and the switch 22B in the joint connector 17 is also closed as illustrated in FIG. 2B, so that the backup line 21 can be used as a communication path between the two joint connectors 16 and 17.

<Internal Configuration of Joint Connector>

Figure 3:
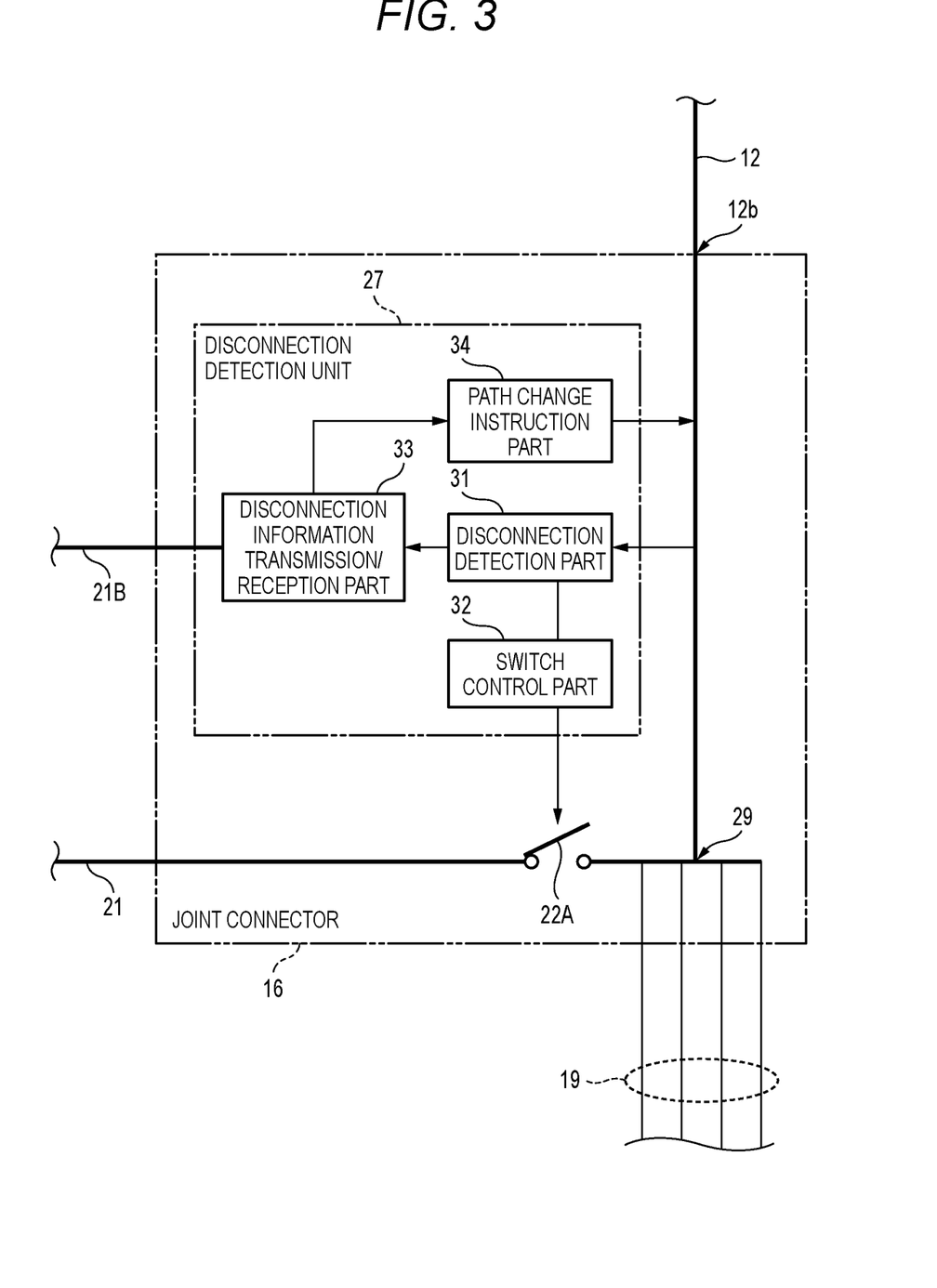
FIG. 3 is a block diagram showing a specific example of an internal configuration of a joint connector at one trunk line end.

A specific example of an internal configuration of one joint connector 16 at a trunk line end is shown in FIG. 3.

As shown in FIG. 3, the disconnection detection unit 27 in the joint connector 16 includes a disconnection detection part 31, a switch control part 32, a disconnection information transmission/reception part 33, and a path change instruction part 34. The disconnection detection unit 28 in the joint connector 17 has the same configuration as the disconnection detection unit 27.

The disconnection detection part 31 can detect presence or absence of disconnection in the trunk line 12. For example, the disconnection detection part 31 can detect the presence or absence of disconnection by monitoring any one or a combination of a potential difference between two communication lines, a potential of each communication line, presence or absence of change in the potential or potential difference, and impedance between communication lines.

Normally, the switch control part 32 performs control so that contacts of the switch 22A are open, and when disconnection is detected by the disconnection detection part 31, the switch control part 32 switches the switch 22A to a state where the contacts thereof are closed.

When disconnection is detected by the disconnection detection part 31 in the disconnection detection unit 27, the disconnection information transmission/reception part 33 transmits disconnection information to the disconnection detection unit 28 on the other side via the disconnection information transmission circuit 21B. In addition, when disconnection is detected by the disconnection detection unit 28 on the other side, the disconnection information transmission/reception part 33 in the disconnection detection unit 27 receives disconnection information transmitted to the disconnection information transmission circuit 21B by the disconnection detection unit 28 and transmits the disconnection information to the path change instruction part 34 thereof.

The path change instruction part 34 includes a communication interface of the CAN standard, and transmits information for instructing change of path to the central gateway 11 by using a communication path of the trunk line 12, in which no disconnection occurs, in accordance with the disconnection information received by the disconnection information transmission/reception part 33.

<State Change of Communication System>

Figure 4:
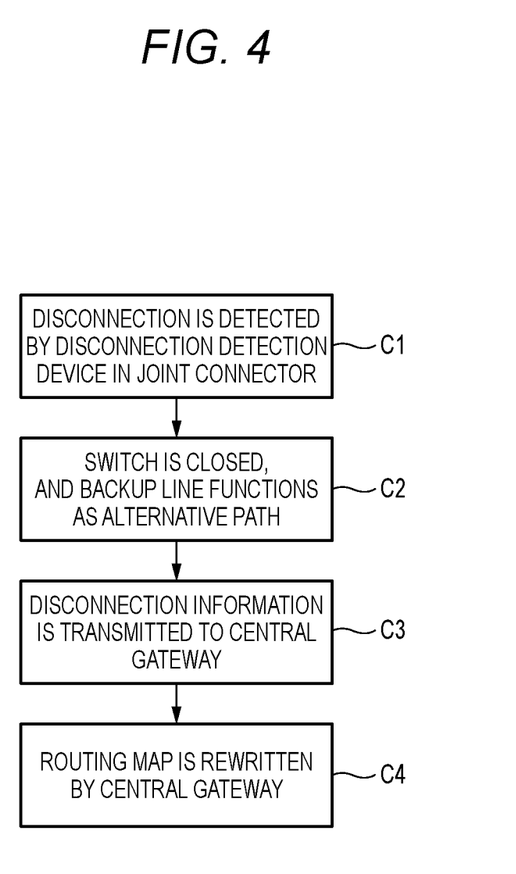
FIG. 4 is a state transition flowchart showing a state change of the communication system at the time when disconnection occurs.

A state change of the communication system 100 at the time when disconnection occurs is shown in FIG. 4.

For example, when disconnection occurs at the disconnection portion 12X of the trunk line 12, a state C1 in FIG. 4 is established. That is, the disconnection detection part 31 detects the disconnection of the trunk line 12 by the disconnection detection unit 27 in the joint connector 16.

Then, the state is transitioned to a state C2, and the contacts of the switch 22A are closed under control of the switch control part 32. Further, since contacts of the switch 22B are also closed on the disconnection detection unit 28 side, the backup line 21 is available as an alternative path.

In a next state C3, the disconnection detection unit 28 that receives disconnection information transmits the disconnection information to the central gateway 11 by using a communication path passing through the trunk line 13 in which no disconnection occurs.

In a next state C4, by control in the central gateway 11 that receives the disconnection information, that is, a path change instruction from the disconnection detection unit 28, the routing map of the central gateway 11 is automatically rewritten so as to use the path of the backup line 21.

<Control Operations of Communication System>

Figure 5:
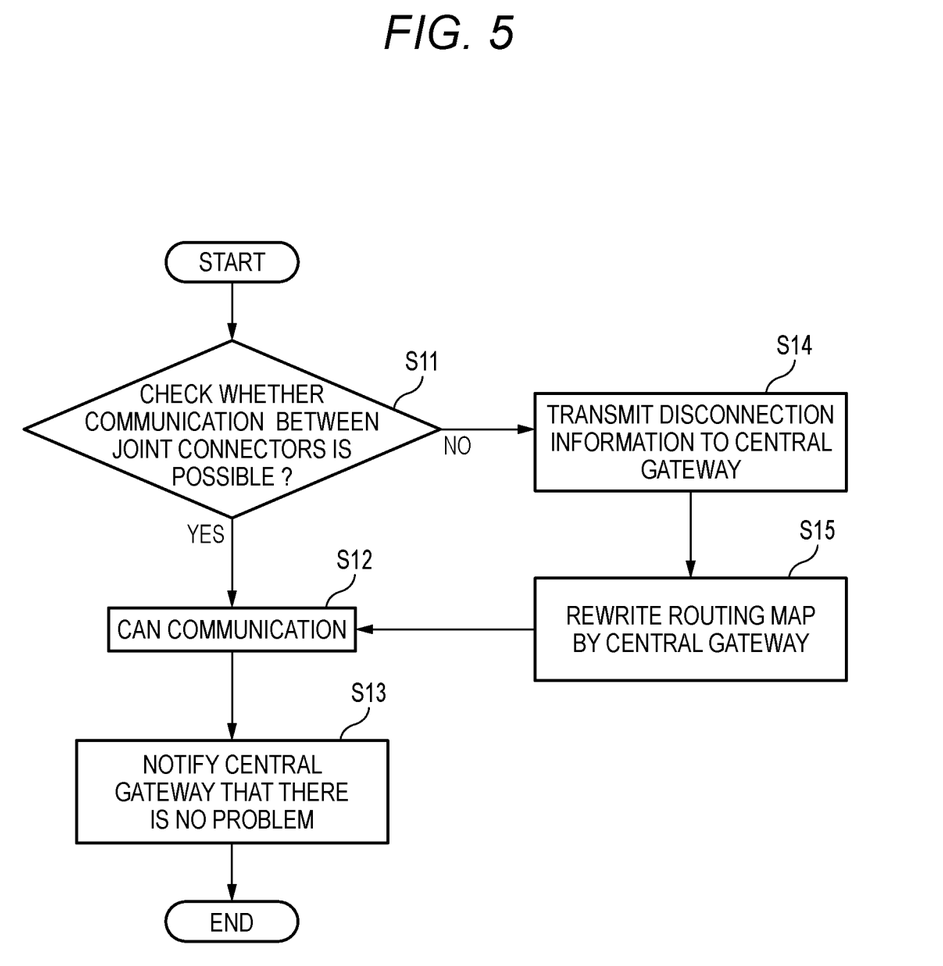
FIG. 5 is a flowchart showing control operations of the communication system for coping with occurrence of disconnection.

Control operations of the communication system 100 for coping with occurrence of disconnection are shown in FIG. 5.

The disconnection detection unit 27 or 28 existing in each of the joint connectors 14 to 17 constantly or periodically monitors and checks whether communication paths to the other joint connectors can be used (electrically connected) (S11).

When the communication paths can be used without any problem, according to the routing map of the central gateway 11, the disconnection detection unit 27 or 28 in each of the joint connectors 14 to 17 performs communication of the CAN standard with the central gateway 11 by using a communication path determined by the central gateway 11 (S12).

The disconnection detection unit 27 or 28 in each of the joint connectors 14 to 17 uses the communication of the CAN standard to notify the central gateway 11 that there is no problem in the current communication path (S13).

When the disconnection detection unit 27 or 28 in any of the joint connectors 14 to 17 detects disconnection, disconnection information generated by the disconnection detection unit 27 or 28 that detects the disconnection is transmitted to the central gateway 11 (S14).

When the central gateway 11 receives the disconnection information transmitted from the disconnection detection unit 27 or 28 in any of the joint connectors 14 to 17, the gateway 11 rewrites the routing map therein (S15). Accordingly, for example, the path passing through the disconnection portion 12X is excluded, and assignment of the communication path is changed so as to use the path of the backup line 21 instead.

Therefore, in the communication system 100 that performs the control as shown in FIG. 5, when a failure such as disconnection at the disconnection portion 12X occurs, the content of the routing map of the central gateway 11 is switched so as to use an alternative path other than the disconnected path. Therefore, even when disconnection occurs, it is possible to avoid an increase in delay time of communication.

<Configuration of Modification>

Figure 6:
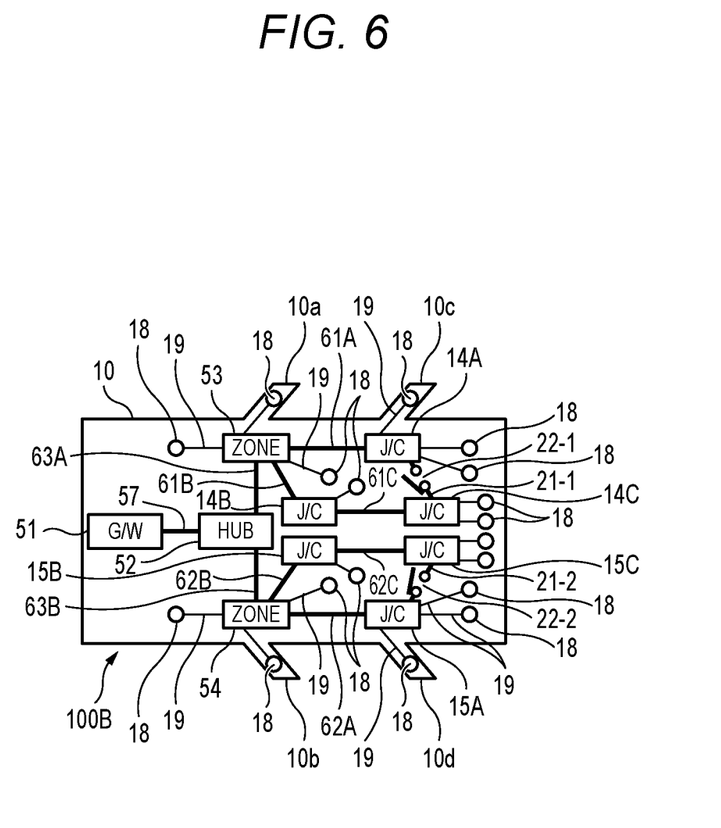
FIG. 6 is a block diagram showing a modification of the configuration of the communication system.

A configuration of a communication system 100B of a second embodiment is shown in FIG. 6.

In the communication system 100B shown in FIG. 6, a central gateway 51, a switching hub (HUB) 52, zone ECUs 53 and 54, high-order communication buses 63A and 63B, joint connectors 14A to 14C and 15A to 15C, zone trunk lines 61A, 61B, 61C, 62A, 62B and 62C, and backup lines 21-1 and 21-2 are connected on communication paths.

In a zone on the right side of a vehicle body, the zone trunk lines 61A, 61B and 61C, and the backup line 21-1 are connected so as to form one closed loop. The zone ECU 53 controls a communication path of this zone. A switch 22-1 is connected in the middle of a path of the backup line 21-1. The switch 22-1 is a normally-off type switch that opens a circuit in a steady state, and is, for example, a switch capable of on-off control, such as a relay. Therefore, in the steady state, a part of the loop of an in-zone communication path is opened, and the backup line 21-1 is disconnected from a CAN bus.

In a zone on the left side of the vehicle body, the zone trunk lines 62A, 62B and 62C, and the backup line 21-2 are connected so as to form one closed loop. The zone ECU 54 controls a communication path of this zone. A switch 22-2 is connected in the middle of a path of the backup line 21-2. The switch 22-2 is a normally-off type switch that opens a circuit in a steady state, and is, for example, a switch capable of on-off control, such as a relay. Therefore, in the steady state, a part of the loop of an in-zone communication path is opened, and the backup line 21-2 is disconnected from a CAN bus.

Meanwhile, an ECU having a function of the central gateway (G/W) 51 is connected to one communication port of the switching hub (HUB) 52 via a high-order communication bus 57. One communication port of the switching hub 52 is connected to the zone ECU 53 via the high-order communication bus 63A, and another communication port of the switching hub 52 is connected to the zone ECU 54 via the high-order communication bus 63B.

Here, a communication network connecting the central gateway 51, the switching hub 52, the high-order communication buses 63A, 63B, and 57, and the zone ECUs 53 and 54 forms a transmission path of the Ethernet (registered trademark) standard. Accordingly, the central gateway 51 and each of the zone ECUs 53 and 54 incorporate a communication interface corresponding to the Ethernet.

In the communication system 100B of FIG. 6, for example, when disconnection occurs in the middle of the zone trunk line 61A in the zone on the right side of the vehicle body, a path passing through the backup line 21-1 and the zone trunk lines 61C and 61B can be used as a communication path connecting the zone ECU 53 and the joint connector 14A, instead of the zone trunk line 61A. In this case, since a disconnection detection unit in the zone ECU 53 or the joint connector 14A detects the disconnection and rewrites a routing map in the zone ECU 53, it is possible to avoid an increase in delay time without being affected by a disconnected portion. In addition, the zone ECU 53 transmits information indicating the rewriting of the routing map to the central gateway 51 via the switching hub 52. The central gateway 51 transmits a control signal to the zone ECU 54 as necessary. The same applies to the zone on the left side of the vehicle body.

Although it is assumed in any of the above-described embodiments that the communication paths are switched only when the wire harness of the communication line is disconnected, it is conceivable to switch the paths even in a condition other than disconnection. For example, in cases such as one where a communication load is increased, one where impedance of the communication line is changed, or one where communication noise is increased, communication quality decreases. That is, since occurrence frequency of an error is increased, and a decrease in communication speed and an increase in delay time are predicted, it is desirable to switch the communication paths in the same manner as in the case of disconnection. Therefore, the decrease in communication quality can be treated equivalently to the occurrence of disconnection.

<Advantages of Communication System 100>

With the communication system 100 shown in FIGS. 1A to 1C, even when disconnection occurs at the disconnection portion 12X, for example, the backup line 21 can be used as an alternative path for communication by closing the switch 22. Moreover, when disconnection is detected, the central gateway 11 rewrites the content of the routing map and preferentially switches to a path using the backup line 21, and thus an increase in delay time of communication can be avoided. Further, since the switch is provided, a part of the loop of the communication path can be controlled to be opened, and a routing map having appropriate content can be created even when a bus-type communication network such as a CAN is configured.

A communication system has a communication line (trunk lines 12 and 13) configured in a loop form and a transmission path having a coupling connector (joint connectors 14 to 17) provided at each of a plurality of connection positions on the communication line. The communication system includes:

a path switch (switch 22);

a disconnection detection part (disconnection detection unit 27);

a gateway (central gateway 11); and a communication path control part (disconnection detection unit 27 or central gateway 11).

The path switch is controllable to cut off a part of the communication line in a steady state is provided inside or near one or a plurality of the coupling connectors.

The disconnection detection part detects presence or absence of disconnection in one or more paths included in the communication line is provided inside or near one or a plurality of the coupling connectors.

The gateway has a routing map for controlling a communication path is connected to the communication line.

When the disconnection detection part detects presence of disconnection, the communication path control part switches one or a plurality of the path switches to a connected state, and changes content of the routing map to enable use of a path passing through the path switch.

According to the communication system having the above configuration, since the communication line is formed in a loop form, when a failure such as disconnection occurs on the communication line, another path can be used. At this time, since the path switch cuts off a part of the communication line in a steady state, a part of the loop is opened in an actual path. Therefore, even when the communication line is a bus-type communication network such as a CAN, the routing map can be created without any problem. In addition, when disconnection occurs, a path different from the disconnected path can be secured by closing the path switch, so that communication is possible. Further, when the disconnection detection part detects the disconnection, the communication path control part changes the content of the routing map and enables use of the path passing through the path switch, so that communication delay can be reduced.

That is, since the communication can be started by selecting from the beginning a backup path different from the disconnected path, it is possible to prevent an increase in delay time.

In the communication system, the communication line may include a first trunk line (trunk line 12), a second trunk line (trunk line 13), and a backup line (21).

A first coupling connector (joint connector 16) may be connected to an end of the first trunk line.

A second coupling connector (joint connector 17) may be connected to an end of the second trunk line.

The backup line may be connected between the first coupling connector and the second coupling connector.

The path switch (switches 22A and 22B) that turns on and off a connected state of the backup line may be provided in at least one of the first coupling connector and the second coupling connector.

According to the communication system having the above configuration, since a path connecting the first trunk line, the first coupling connector, the backup line, the second coupling connector, and the second trunk line is formed, a communication path in a loop form can be formed. At this time, since the path switch cuts off the connection of the backup line in the steady state, the actual path does not form a loop. However, since an entire communication path including the path switch is in a loop form, for example, when disconnection occurs on the first trunk line, communication can be performed by using a path that passes both the backup line and the second trunk line. When disconnection occurs on the second trunk line, communication can be performed by using a path that passes both the backup line and the first trunk line.

In the communication system, the first coupling connector (joint connector 16) may be provided with a first path switch (switch 22A) and a first disconnection detection part (disconnection detection unit 27).

The second coupling connector (joint connector 17) may be provided with a second path switch (switch 22B) and a second disconnection detection part (disconnection detection unit 28).

When one of the first disconnection detection part and the second disconnection detection part detects disconnection of the first trunk line or disconnection of the second trunk line, the communication path control part may switch both the first path switch and the second path switch to a state in which the backup line is connected.

According to the communication system having the above configuration, disconnection in the first trunk line can be detected by the first disconnection detection part, and disconnection in the second trunk line can be detected by the second disconnection detection part. Further, it is possible to switch on and off the connection between the first trunk line and the backup line by using the first path switch, and to switch on and off the connection between the second trunk line and the backup line by using the second path switch. In addition, since there are two path switches, the backup line can be connected to the end of the first trunk line or to the end of the second trunk line.

In the communication system, the first disconnection detection part may include a first disconnection transmission part (disconnection information transmission/reception part 33) that transmits disconnection detection information to both the second coupling connector and the gateway, and The second disconnection detection part may include a second disconnection transmission part (disconnection information transmission/reception part 33) that transmits disconnection detection information to both the first coupling connector and the gateway.

According to the communication system having the above configuration, when the first trunk line is disconnected, the second path switch can be closed in response to the disconnection detection information transmitted by the first disconnection transmission part, and further the routing map of the gateway can be automatically changed. Further, when the second trunk line is disconnected, the first path switch can be closed in response to the disconnection detection information transmitted by the second disconnection transmission part, and further the routing map of the gateway can be automatically changed.

The communication system may further include:

a disconnection information transmission circuit (21B) that is provided in parallel with the backup line, in which the first disconnection transmission part and the second disconnection transmission part may transmit the disconnection detection information between the first coupling connector and the second coupling connector by using the disconnection information transmission circuit.

According to the communication system having the above configuration, the disconnection detection information can be transmitted between the first coupling connector and the second coupling connector all the time regardless of states of the first path switch and the second path switch.

According to the vehicle communication system of the present invention, when a failure such as disconnection of one communication path occurs, another communication path that is not disconnected can be used, and thus communication reliability can be improved. Further, communication delay can be reduced by change of the routing map.

What is claimed is:

1. A communication system that has a communication line configured in a loop form and a transmission path having a coupling connector provided at each of a plurality of connection positions on the communication line, the communication system comprising:

a first path switch and a second path switch;

a first coupling connector that includes a first disconnection detection device that detects presence or absence of disconnection in one or more paths;

a second coupling connector that includes a second disconnection detection device that detects presence or absence of disconnection in the one or more paths;

a disconnection information transmission circuit that directly connects the first disconnection detection device to the second disconnection device;

a backup line that is connected between the first coupling connector and the second coupling connector, and the backup line is provided in parallel to the disconnection information transmission circuit;

a gateway; and a communication path control part, wherein the gateway that has a routing map for controlling a communication path is connected to the communication line, and wherein when one of the first disconnection detection device and the second disconnection detection device detects presence of disconnection, the communication path control part switches the first path switch and the second path switch to a connected state, and changes content of the routing map to enable use of a path passing through the first path switch and the second path switch.

2. The communication system according to claim 1, wherein the communication line includes a first trunk line, a second trunk line, and the backup line, wherein the first coupling connector is connected to an end of the first trunk line, wherein the second coupling connector is connected to an end of the second trunk line, and wherein one of the first path switch and the second path switch that turns on and off a connected state of the backup line is provided in a respective one of the first coupling connector and the second coupling connector.

3. The communication system according to claim 2, wherein the first coupling connector is provided with the first path switch, wherein the second coupling connector is provided with the second path switch, and wherein when one of the first disconnection detection device and the second disconnection detection device detects disconnection of the first trunk line or disconnection of the second trunk line, the communication path control part switches both the first path switch and the second path switch to a state in which the backup line is connected.

4. The communication system according to claim 3, wherein the first disconnection detection device includes a first disconnection transmission part that transmits disconnection detection information to both the second coupling connector and the gateway, and wherein the second disconnection detection device includes a second disconnection transmission part that transmits disconnection detection information to both the first coupling connector and the gateway.

5. The communication system according to claim 4, wherein the first disconnection transmission part and the second disconnection transmission part transmit the disconnection detection information between the first coupling connector and the second coupling connector by using the disconnection information transmission circuit.

* * * * *